(12) United States Patent (10) Patent No.: US 12,395,605 B2
Tang et al. (45) Date of Patent: Aug. 19, 2025

(54) LOSSLESS AR VIDEO CAPTURE AND TRANSMISSION METHOD, APPARATUS AND SYSTEM

(71) Applicant: Shenzhen 8k-link Optoelectronics Technology Co., Ltd., Shenzhen (CN)

(72) Inventors: Lingfeng Tang, Shenzhen (CN); Jun Jiang, Shenzhen (CN); Xinghui Jin, Shenzhen (CN)

(73) Assignee: Shenzhen 8K-link Optoelectronics Technology Co., Ltd., Shenzhen (CN)

( * ) Notice: Subject to any disclaimer, the term of this patent is extended or adjusted under 35 U.S.C. 154(b) by 651 days.

(21) Appl. No.: 17/698,362

(22) Filed: Mar. 18, 2022

(65) Prior Publication Data

US 2023/0021901 A1 Jan. 26, 2023

(30) Foreign Application Priority Data

Jul. 20, 2021 (CN) .......................... 202110508136.3

(51) Int. Cl.
*H04N 7/01* (2006.01)
*H04N 7/12* (2006.01)
(Continued)

(52) U.S. Cl.
CPC ................. *H04N 7/01* (2013.01); *H04N 7/12* (2013.01); *H04N 7/22* (2013.01); *H04N 23/661* (2023.01)

(58) Field of Classification Search
CPC .. H04N 7/01; H04N 7/12; H04N 7/22; H04N 23/661; H04N 23/90; H04N 13/161; H04N 13/139; H04N 13/167; H04N 13/194
See application file for complete search history.

(56) References Cited

U.S. PATENT DOCUMENTS 8,488,969 B1 7/2013 Masarik
2020/0213680 A1* 7/2020 Ingel .................. H04N 21/8106
(Continued)

FOREIGN PATENT DOCUMENTS

CN 111025651 A 4/2020
CN 111181646 A 5/2020
CN 112995611 A 6/2021

OTHER PUBLICATIONS

Chinese Office Action for Chinese Application No. 202110508136.3 dated Jun. 8, 2022 (9 pages).
(Continued)

*Primary Examiner* — Kelly L Jerabek
(74) *Attorney, Agent, or Firm* — REISING ETHINGTON, P.C.

(57) ABSTRACT

The present disclosure relates to a lossless AR video capture and transmission method, apparatus and system. The method includes converting combined analog electronic signals synchronously captured by a plurality of image sensors and a plurality of sound pickups into multi-channels of first digital signals; losslessly converting the multi-channels of first digital signals into multi-channels of second digital signals; obtaining multi-channels of first optical signals by performing respective photoelectric conversions on the multi-channels of second digital signals; receiving the multi-channels of first optical signals, and converting the multi-channels of first optical signals into the multi-channels of second digital signals; and parsing at least one channel of second digital signal among the multi-channels of second digital signals into an AR video.

10 Claims, 5 Drawing Sheets

(51) Int. Cl.
*H04N 7/22* (2006.01)
*H04N 23/661* (2023.01)

(56) References Cited

U.S. PATENT DOCUMENTS

2022/0394218 A1* 12/2022 Yu .......................... H04B 10/25
2023/0053020 A1* 2/2023 Chen ................ H04B 10/25751
2024/0063916 A1* 2/2024 Shitaba ................ H04B 10/503

OTHER PUBLICATIONS

English Translation of Chinese Office Action for Chinese Application No. 202110508136.3 dated Jun. 8, 2022 (10 pages).

* cited by examiner

LOSSLESS AR VIDEO CAPTURE AND TRANSMISSION METHOD, APPARATUS AND SYSTEM

CROSS-REFERENCE TO RELATED APPLICATIONS

This application claims the priority of the Chinese Patent Application No. 202110508136.3, filed with China National Intellectual Property Administration on Jul. 20, 2021, the content of which is herein incorporated by reference in its entirety.

TECHNICAL FIELD

The present disclosure relates to the field of video capture and transmission, and in particular relates to a lossless AR video capture and transmission method, apparatus and system.

BACKGROUND

Due to a huge amount of data generated in an Augmented Reality (AR) or Mixed Reality (MR) video capture process, it is usually necessary to compress a lossless signal output by a sound pickup and/or an image processor and/or a digital-to-analog converter by using an image processor, and then transmit it to a processor via conventional cables to perform a data processing, such as decompression and decoding, and the data storage, image display or other disclosures can be performed only after this data processing.

There are the following insurmountable problems in this way of working: 1). the digital signal captured by the AR video must be compressed and then transmitted, so the distortion problem will inevitably occur after the signal is processed; 2). the processing before and after the signal transmission requires a certain time, so there is an inevitable delay in the entire system; 3). the signal transmission is completed by conventional cables, so the transmission speed is limited, and the high-definition image transmission capacity is limited; 4). the conventional cable transmission process will be subject to the electromagnetic interference, which will cause data distortion or even loss in severe cases; 5). in order to improve image clarity, it is necessary to use more and thicker cable harnesses for signal transmission; 6). the external size of the video capture and transmission apparatus is limited by the physical size of various processors, and it cannot be made smaller; 7). more processors means more power consumption.

SUMMARY

According to a first aspect of the present disclosure, a lossless AR video capture and transmission method is provided. The method may include: converting combined analog electronic signals synchronously captured by a plurality of image sensors and a plurality of sound pickups into multi-channels of first digital signals; losslessly converting the multi-channels of first digital signals into multi-channels of second digital signals; obtaining multi-channels of first optical signals by performing respective photoelectric conversions on the multi-channels of second digital signals; receiving the multi-channels of first optical signals, and converting the multi-channels of first optical signals into the multi-channels of second digital signals; and parsing at least one channel of second digital signal among the multi-channels of second digital signals into an AR video.

According to a second aspect of the present disclosure, a lossless AR video capture and transmission system is provided. The lossless AR video capture and transmission system may include a lossless AR video capture apparatus, a lossless AR video receiving apparatus, and an optical splitter, wherein the lossless AR video capture apparatus and the lossless AR video receiving apparatus are connected by an optical cable; wherein the lossless AR video capture apparatus is configured to convert combined analog electronic signals synchronously captured by a plurality of image sensors and a plurality of sound pickups into multi-channels of first digital signals; losslessly convert the multi-channels of first digital signals into multi-channels of second digital signals; and obtain multi-channels of first optical signals by performing respective photoelectric conversions on the multi-channels of second digital signals; wherein the lossless AR video receiving apparatus is configured to receive the multi-channels of first optical signals, and convert the multi-channels of first optical signals into the multi-channels of second digital signals; and parse at least one channel of second digital signal among the multi-channels of second digital signals into an AR video; wherein the optical splitter is configured to copy or forward the multi-channels of first optical signals.

DETAILED DESCRIPTION

The principles and features of the present disclosure will be described below with reference to the accompanying drawings. The examples are only used to explain the present disclosure, but not to limit the scope of the present disclosure.

The terms "first", "second", "third", "fourth", etc. (if any) in the description and claims of this disclosure and the above-mentioned drawings are used to distinguish similar objects and are not necessarily used to describe a specific order or sequence. It is to be understood that the data used in this way may be interchanged under appropriate circumstances so that the embodiments of the disclosure described herein can be practiced in sequences other than those illustrated or described herein. Furthermore, the terms "comprising" and "having" and any variations thereof, are intended to cover non-exclusive inclusion, for example, a process, method, system, product or device comprising a series of steps or units is not necessarily limited to those expressly listed. Rather, those steps or units may include other steps or units not expressly listed or inherent to these processes, methods, products or devices.

Embodiment 1

Figure 1:
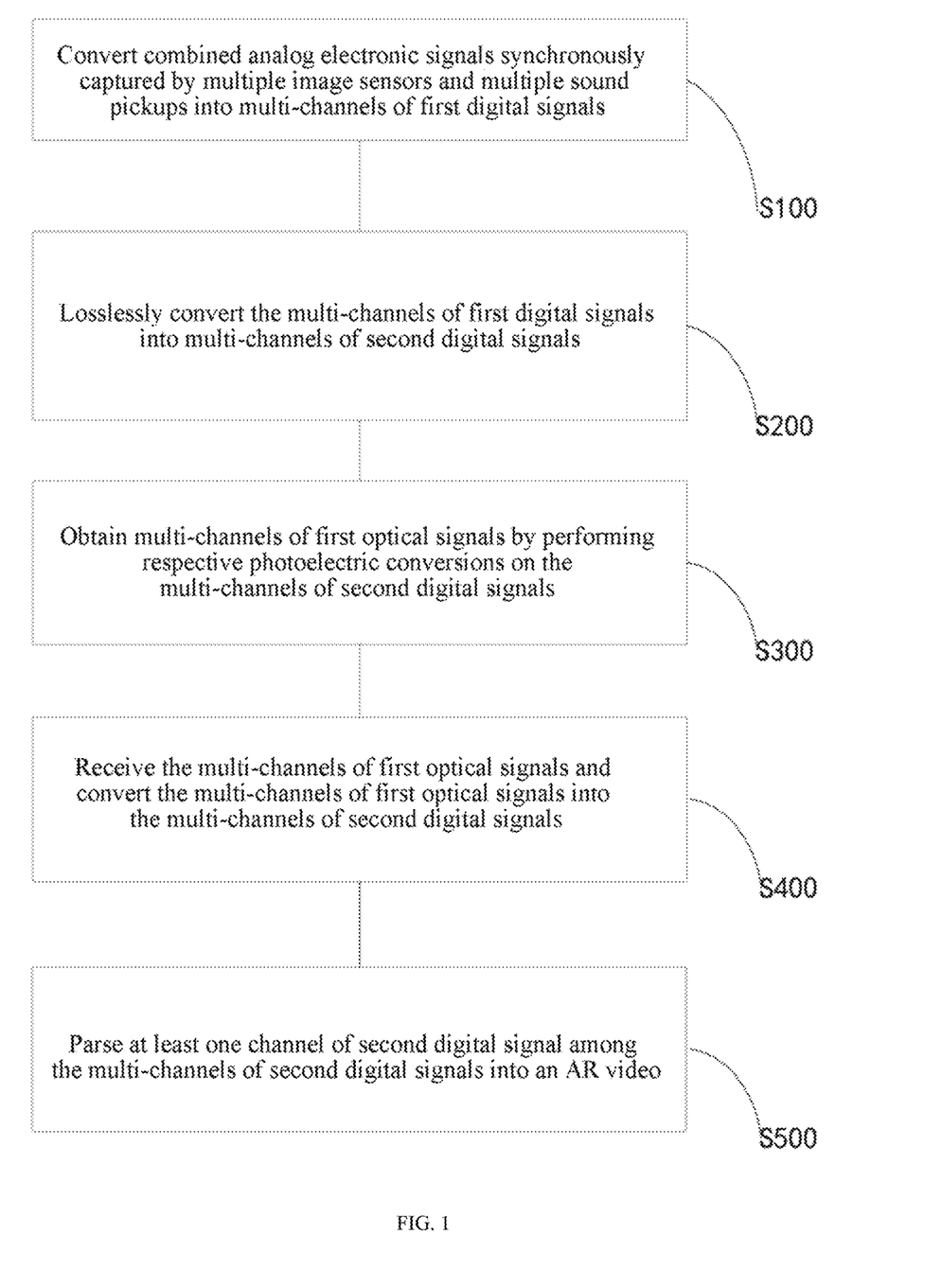
FIG. 1 is a schematic flowchart of a lossless AR video capture and transmission method in some embodiments of the present disclosure.

Referring to FIG. 1, a first aspect of the present disclosure provides a lossless AR video capture and transmission method. The method may include: S100, converting combined analog electronic signals synchronously captured by a plurality of image sensors and a plurality of sound pickups into multi-channels of first digital signals; S200, obtaining multi-channels of second digital signals by performing respective lossless conversions on the multi-channels of first digital signals; S300, obtaining multi-channels of first optical signals by performing respective photoelectric conversions on the multi-channels of second digital signals; S400, receiving the multi-channels of first optical signals, and converting the multi-channels of first optical signals into the multi-channels of second digital signals; S500, parsing at least one channel of second digital signal among the multi-channels of second digital signals into an AR video.

It should be understood that the first digital signal is a discrete digital signal obtained by directly processing an analog signal synchronously collected by the image sensor and the sound pickup via an analog-to-digital conversion module (i.e., an analog-to-digital conversion circuit), and the discrete digital signal can be used to represent video information. The above-mentioned image sensor includes, but is not limited to, a Complementary Metal-Oxide-Semiconductor (CMOS) image sensor, and a Charge-coupled Device (CCD) image sensor. The above-mentioned sound pickup includes, but is not limited to, a digital pickup and a microphone.

The image data format output by the first digital signal is an image data format directly output by the image sensor, which include YUV, RGB, RAW DATA, JPEG, etc. The audio data format output by the first digital signal is a data format directly output by the sound pickup, which includes PCM, WAV, I2S, etc. The video data formats include lossless (uncompressed) arrangement and/or encapsulation on the aforementioned image data formats and audio data formats according to standard video output protocols. For example, MP4, AVI, etc.

In order to facilitate transmission, the second digital signal is a digital signal obtained by lossless packaging or encapsulation on the first digital signal according to the standard protocol or interface standard protocol of the device side. The standard protocol of the device side includes, but is not limited to, RGB, LVDS, MIPI, eDP, HDMI, miniLVDS, V-by-One.

In some embodiments of the present disclosure, in order to facilitate the transmission of high-definition AR video, the second digital signal is a Mobile Industry Processor Interface (MIPI) signal. In order to overcome the problems mentioned in the background art, reduce the information loss in the AR (Augmented Reality) video capture process, and improve the AR video transmission rate, According to the present disclosure, the captured raw analog electric signal is converted into the optical signal without compression, and then the optical signal is transmitted and restored into the AR video, so that the expandability, the transmission rate and the resolution of the AR video are improved, the condition of data distortion or loss is reduced, the problem of electromagnetic interference (EMC/EMI) in the high-speed signal transmission process is eliminated, and the cost is saved. Furthermore, the lossless AR video capture and transmission method is capable to reduce the information loss in the AR (Augmented Reality) video capture process, and improve the AR video transmission rate.

Figure 2:
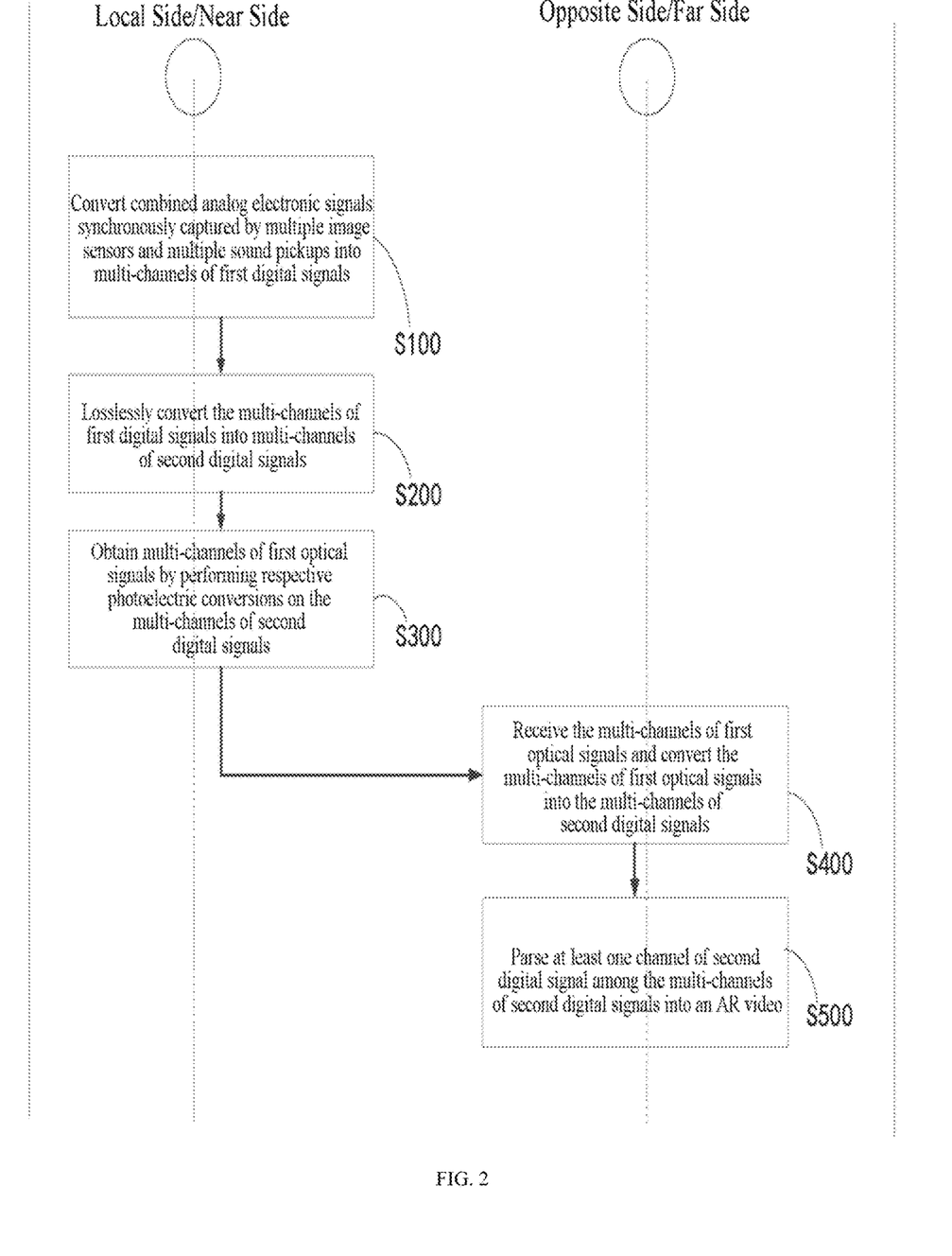
FIG. 2 is a schematic flowchart of a lossless AR video capture and transmission method in some embodiments of the present disclosure.

Referring to FIG. 2, steps S100 to S300 are performed by a local side or a near side. For example, the local side or the near side converts combined analog electronic signals synchronously captured by a plurality of image sensors and a plurality of sound pickups into multi-channels of first digital signals; losslessly converts the multi-channels of first digital signals into multi-channels of second digital signals; obtains multi-channels of first optical signals by performing respective photoelectric conversions on the multi-channels of second digital signals; and transmits the multi-channel of first optical signals to an opposite side or a far side via an optical cable. By using a multiplexing technique, the multi-channels of first optical signals are modulated into one or a few of physical channels for transmitting the multi-channels of first optical signals. The number of channels of the multi-channels of first optical signals is greater than the number of physical channel of the at least one physical channel. Since the number of physical channel of the physical channels used to transmit the multi-channels of first optical signals is reduced, the volume and the weight of trances are also reduced. Alternatively, the physical channel can be the optical fiber.

Correspondingly, steps S400 to S500 are performed by the opposite side or the far side. For example, the opposite side or the far side receives the multi-channels of first optical signals, and converts the multi-channels of first optical signals into the multi-channels of second digital signals; and parses at least one channel of second digital signal among the multi-channels of second digital signals into an AR video.

Without loss of generality, the local side or the near side is usually an image sensor or a module or device having a photosensitive element and an image processing module, for example, various types of cameras, cameras having video recording modules, and mobile phones. The opposite side or far side is usually terminal equipment, etc. The terminal equipment includes electronic device with lossless image processing capability, such as high-definition digital TV/display, mobile phone, tablet computer, wearable electronic device having wireless communication function (such as virtual reality helmet or glasses, hybrid helmet or glasses) etc. The embodiments of terminal equipment include, but are not limited to, portable electronic devices powered by or having other operating systems. The above-mentioned terminal equipment may also be other portable electronic devices, such as a laptop computer. It should also be understood that, in some other embodiments, the above-mentioned electronic device may not be terminal equipment, but a desktop computer or a server composed of multiple desktop computers.

Further, in the above embodiments, the step of converting the combined analog electronic signals synchronously captured by the plurality of image sensors and the plurality of sound pickups into multi-channels of first digital signals may include the following steps: acquiring a combined analog electronic signal synchronously captured by one image sensor and at least one sound pickup corresponding to the one image sensor; and obtaining multi-channels of first digital signals by respectively performing an analog-todigital conversion on each of a plurality of the combined analog electronic signals. In some embodiments, the above-mentioned the plurality of image sensors or the plurality of sound pickups can be combined into an image sensor array and a sound pickup array; and each image sensor can be combined with one or more sound pickups to obtain a combined analog electronic signal.

Furthermore, the step of the obtaining the multi-channels of first optical signals by performing respective photoelectric conversions on the multi-channels of second digital signals includes the following steps: obtaining multi-channels of MIPI signals by losslessly outputting each of the multi-channels of the first digital signals as a MIPI signal according to the MIPI protocol; and obtaining multi-channels of first optical signals by performing respective photoelectric conversions on the multi-channels of MIPI signals.

Furthermore, the step of the parsing at least one channel of second digital signal among the multi-channels of second digital signals into the AR video includes: selecting one or more channels of MIPI signals from the multi-channels of MIPI signals, and synthesizing and parsing the one or more channels of MIPI signals into the AR video.

In some embodiments, before converting the combined analog electronic signals synchronously captured by multiple image sensors and multiple sound pickups into multi-channels of first digital signals, the lossless AR video capture and transmission method further includes: obtaining and transmitting a second optical signal by performing a photoelectric conversion on a third digital signal; restoring the transmitted second optical signal back to the third digital signal by performing a photoelectric conversion on the transmitted second optical signal; and in response to the restored third digital signal, converting the combined analog electronic signals synchronously captured by multiple image sensors and multiple sound pickups into multi-channels of first digital signals, It should be understood that the third digital signal is a control signal sent by the processor at the opposite side or the far side in the above-mentioned embodiments, and the control signal sends, via optical transmission, a capture request to the image capture device or the sound pickup at the near side or the local side, and in response to the capture request, the image capture device or the sound pickup performs the image signal capture. The control signal can also be transmitted by a copper cable or other forms of cable.

Embodiment 2

Figure 3:
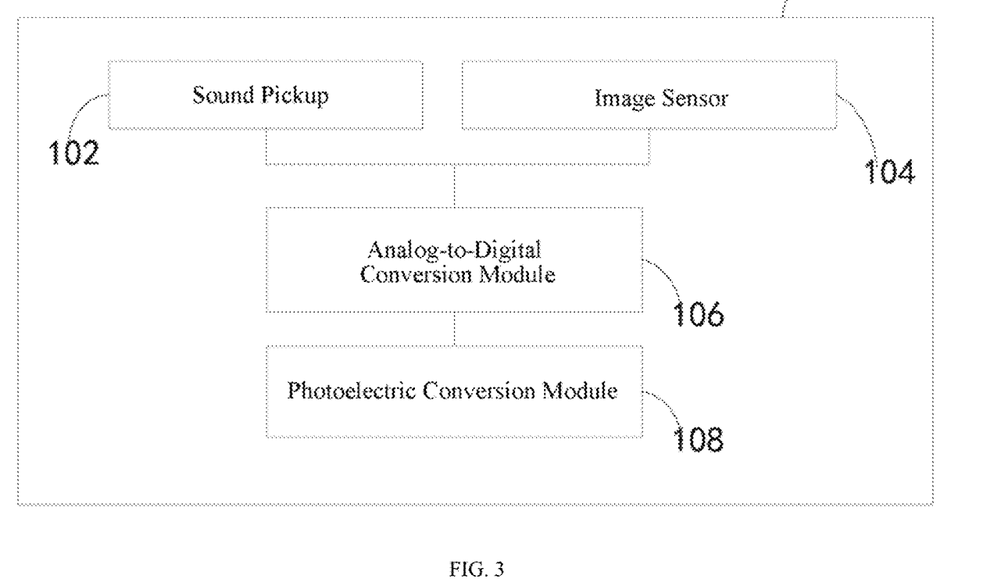
FIG. 3 is a schematic structural diagram of a lossless AR video capture apparatus some embodiments of the present disclosure.

Referring to FIG. 3, according to a second aspect of the present disclosure, a lossless AR video capture apparatus 100 is provided. The lossless AR video capture apparatus 100 may include a plurality of sound pickups 102 (only one is shown in FIG. 3), a plurality of image sensors 104 (only one is shown in FIG. 3), an analog-to-digital conversion module 106, and a photoelectric conversion module 108. The analog-to-digital conversion module 106 is used to convert combined analog electronic signals synchronously captured by the multiple image sensors and the multiple sound pickups into multi-channels of first digital signals; and further lesslossly convert the multi-channels first digital signals into multi-channels of second digital signals. The photoelectric conversion module 108 is used to obtain multi-channels of first optical signals by performing respective photoelectric conversions on the multi-channels of second digital signals. In some application scenarios, in order to reduce the overall size and volume of the AR video capture apparatus, the sound pickup 102, the image sensor 104 and the analog-to-digital conversion module 106 may be integrated into one module or one module group, for example, integrated into video capture cards/modules.

It can be understood that the light passing through the lens is shone on the image sensor (usually a CMOS chip), and the sensor converts the received light into analog electronic signals, and at same time these electronic signals are converted into digital signals by the analog-to-digital converter integrated inside the image sensor, and output them in the MIPI mode. At this time, the output digital signal is not compressed and is a completely lossless raw data signal.

Figure 4:
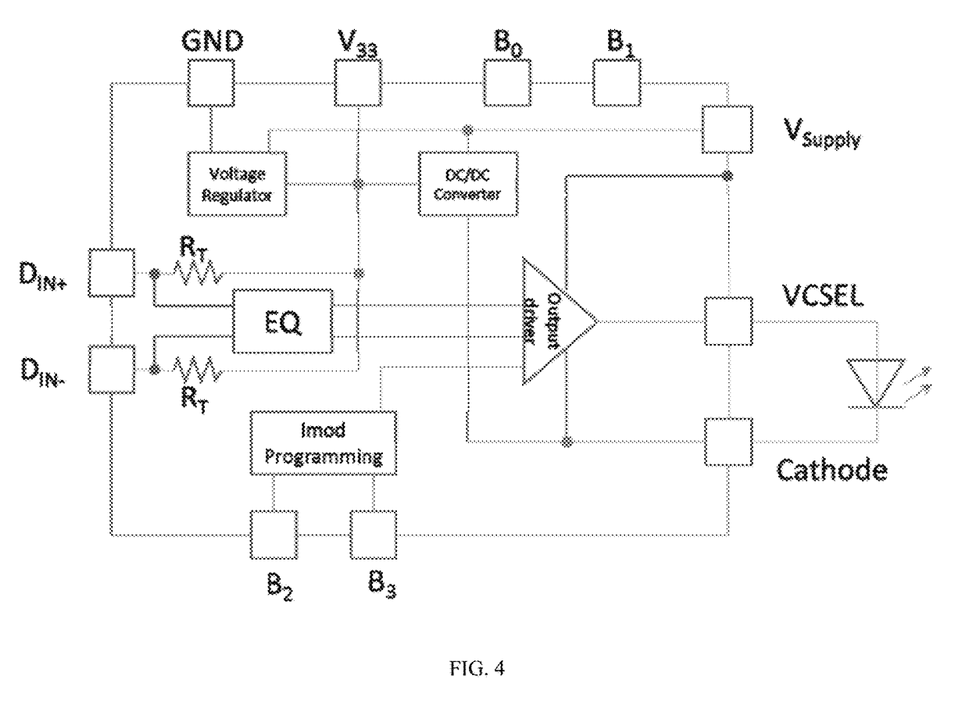
FIG. 4 is a schematic block diagram of a photoelectric conversion module of a lossless AR video capture apparatus in some embodiments of the present disclosure.

Referring to FIG. 4, it shows the circuit diagram of the electrical-to-optical conversion part of the photoelectric conversion module 108. The photosensitive element (for example, a light-emitting diode) converts the optical signal into an electronic signal by sequentially using a comparator, a filter unit (i.e., an EQ filter and two resistors RT), wherein $V_{supply}$ represents the voltage of the power supply, $V_{csel}$ represents the voltage of the CSEL (Vertical Cavity Surface Emitting Laser) laser, and cathode represents the cathode of the light-emitting diode. Furthermore, B0, B1, B2, B3 represent four pin-outs or contacts, which are used for detecting or sampling current or voltage, and other GND, DC/DC, V33 and other common components represent grounding, power supply and its control circuit, which will not be repeated here.

Figure 5:
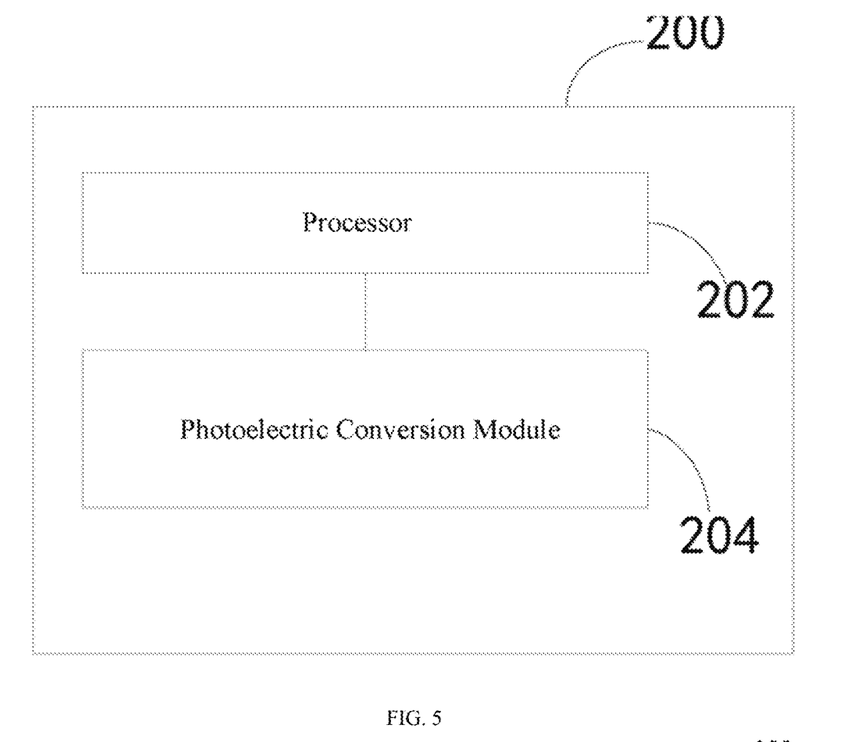
FIG. 5 is a schematic structural diagram of a lossless AR video receiving apparatus in some embodiments of the present disclosure.

Referring to FIG. 5, according to a third aspect of the present disclosure a lossless AR video receiving apparatus 200 is provided. The lossless AR video receiving apparatus 200 includes a processor 202 and a photoelectric conversion module 204. The photoelectric conversion module 204 is configured to receive the multi-channels of first optical signals, and convert the multi-channels of first optical signals into multi-channels of second digital signals. The processor 202 is configured to parse at least one channel of second digital signal of the multi-channels of second digital signals into the AR video.

Embodiment 3

Figure 6:
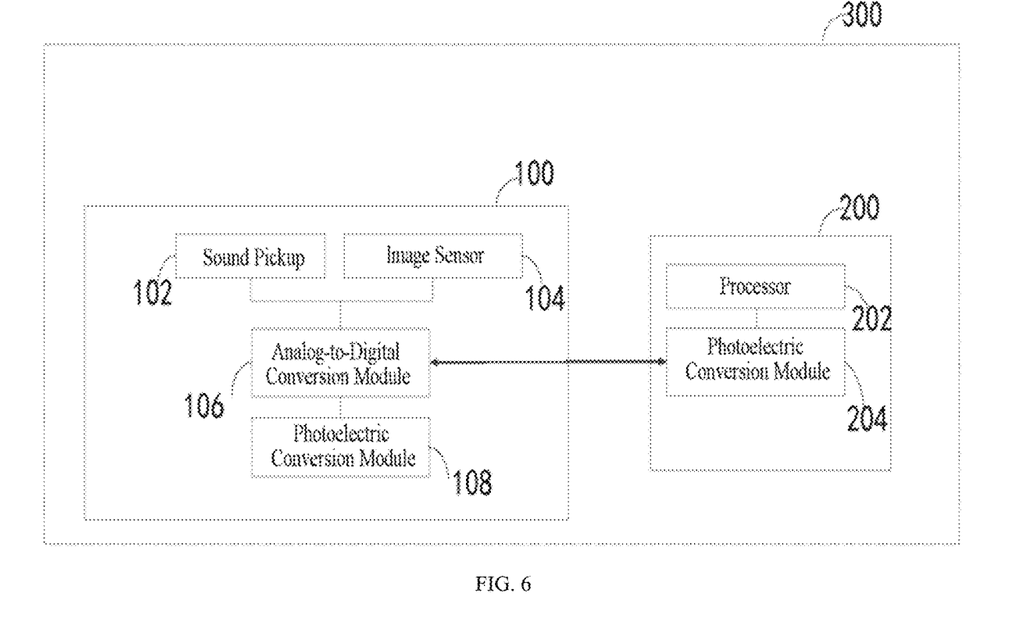
FIG. 6 is a schematic diagram of a structure of a lossless AR video capture and transmission system in some embodiments of the present disclosure.

Referring to FIG. 6, according to a fourth aspect of the present disclosure, a lossless AR video capture and transmission system 300 is provided. The lossless AR video capture and transmission system 300 may include a lossless AR video capture apparatus 100, a lossless AR video receiving apparatus 200, and an optical splitter. The lossless AR video capture apparatus 100 and the lossless AR video receiving apparatus 200 are connected by an optical cable. The lossless AR video capture apparatus 100 is configured to convert combined analog electronic signals synchronously captured by a plurality of image sensors and a plurality of sound pickups into multi-channels of first digital signals; losslessly convert the multi-channels of first digital signals into multi-channels of second digital signals; and obtain multi-channels of first optical signals by performing respective photoelectric conversions on the multi-channels of second digital signals. The lossless AR video receiving apparatus 200 is configured to receive the multi-channels of first optical signals, and convert the multi-channels of first optical signals into the multi-channels of second digital signals; and parse at least one channel of second digital signal among the multi-channels of second digital signals into an AR video. The optical splitter is configured to copy or forward the multi-channels of first optical signals.

Figure 7:
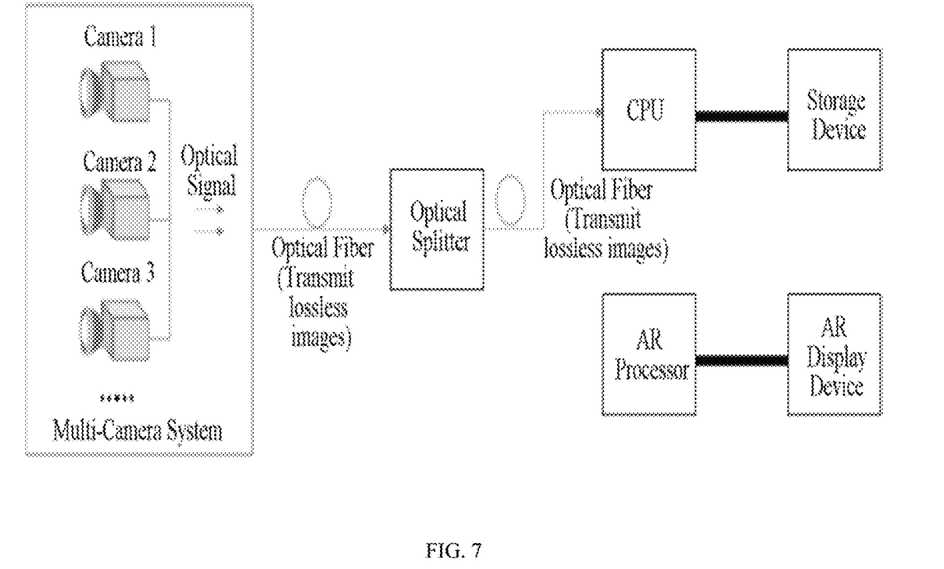
FIG. 7 is a schematic diagram of a structure of a lossless AR video capture and transmission system in some embodiments of the present disclosure.

Referring to FIG. 7, in some embodiments of the lossless AR video capture and transmission system 300, the lossless AR video capture apparatus 100 is a camera, which includes a lens and a mainboard. The mainboard is provided with a sound pickup 102 (not shown in FIG. 7), an image sensor 104, an analog-to-digital conversion module 106 and a photoelectric interface (not shown in FIG. 7). The sound pickup 102, the image sensor 104 and the analog-to-digital conversion module 106 are integrated in one module group. The photoelectric interface includes a photoelectric conversion chip, that is, the photoelectric conversion module 108. The lossless AR video receiving apparatus 200 is a server. The server includes a processor 202 and an optoelectronic interface, and the optoelectronic interface includes an optoelectronic conversion chip (i.e., an optoelectronic conversion module 204). In some embodiments, the processor 202 includes a CPU and an AR processor, and the CPU stores at least one channel of second digital signal among the multi-channels of second digital signals into the storage device. The AR processor parses the at least one channel of second digital signal among the multi-channels of second digital signals into the AR video.

The specific process of lossless image capture and transmission of the lossless AR video capture and transmission system 300 is as follows: the processor of the server sends a control signal, the control signal is converted into an optical signal via an optoelectronic interface, the optical signal is transmitted to the optical interface of the lossless AR video receiving apparatus 200 through an optical fiber, and then the lossless AR video receiving apparatus 200 restores the optical signal back to the control signal; the control signal sends a capture request to the image sensor 104 and the sound pickup 102; the image sensor 104 and the sound pickup 102, in response to the control signal, convert the captured raw analog signal into the digital signal; the analog-to-digital conversion module converts the digital signal into a MIPI signal and sends it to the server via the photoelectric interface, and the server restores it back as a high-fidelity MIPI signal via the photoelectric conversion, which is used for providing raw data to subsequent AR video processing, storage, display, and other visual control signal, and used for flexible processing or expanding the AR video.

It should be noted that the optical signal is transmitted into the optical fiber through the special connector, and in the optical fiber, in the process of transmitting the optical signal to the server end, the transmission bandwidth is up to 100 G, the transmission distance can reach more than 100 meters, and the transmission is almost zero delay. Furthermore, the camera is powered from the server (or the host) via a set of copper lines, and the set of copper lines is also used for transmitting both camera control signals and sensor signals, and the control signals can be modulated to transmit via the power line to reduce the number of cable harnesses. The MIPI signal in the above embodiment can also be replaced with other forms of the second digital signal mentioned in the first aspect of the present disclosure, such as RGB, LVDS, MIPI, eDP, miniLVDS, V-by-One and so on.

Embodiment 4

According to a fifth aspect of the present disclosure, an electronic device is provided. The electronic device may include one or more processors; a memory for storing one or more programs, when the one or more programs are executed by the one or more processor, the one or more processors implement the method provided by the first aspect of the present disclosure.

Figure 8:
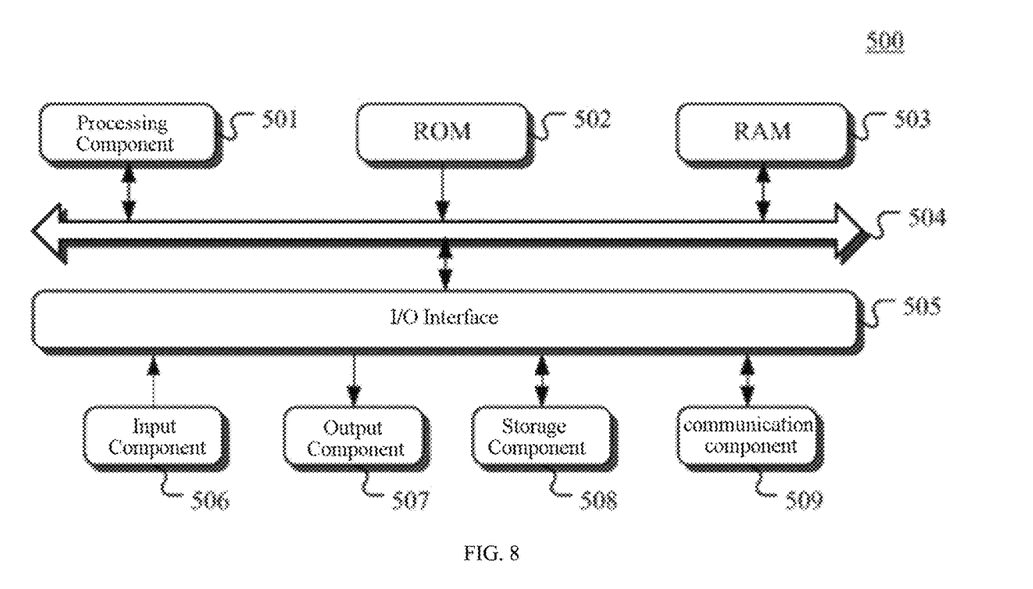
FIG. 8 is a schematic structural diagram of electronic device.

In some embodiments, referring to FIG. 8, the electronic device 500 may include a processing component 501 (for example, a central processing unit, a graphics processor, etc.), which may execute various appropriate actions and processes according to programs stored in the read-only memory (ROM) 502 or programs loaded into a random access memory (RAM) 503 from the storage component 508. In the RAM 503, various programs and data necessary for the operation of the electronic device 500 are also stored. The processing component 501, the ROM 502, and the RAM 503 are connected to each other through a bus 504. An input/output (I/O) interface 505 is also connected to bus 504.

Typically the following components can be connected to the I/O interface 505: an input component 506 including, for example, a touch screen, touchpad, keyboard, mouse, camera, microphone, accelerometer, gyroscope, etc.; an output component 507 including, for example, a liquid crystal display (LCD), speakers, vibrators, etc.; a storage component 508 including, for example, a hard disk; and a communication component 509. The communication component 509 may allow electronic device 500 to communicate wirelessly or by wire with other devices to exchange data. Although FIG. 8 shows electronic device 500 having various components, it should be understood that not all of the illustrated components are required to be implemented or provided. More or fewer component may alternatively be implemented or provided. Each block shown in FIG. 8 can represent one component, and can also represent multiple components as required.

In a sixth aspect of the present disclosure, in particular, according to an embodiment of the present disclosure, the processes described above with reference to the flowcharts may be implemented as a computer software program. For example, embodiments of the present disclosure include a computer program product, which includes a computer program carried on a computer-readable medium; and the computer program contains program code for performing the method illustrated in the flowchart. In such an embodiment, the computer program may be downloaded and installed from the network via the communication component 509, or be downloaded and installed from the storage component 508 or from the ROM 502. When the computer program is executed by the processing component 501, the above-described functions defined in the methods of the embodiments of the present disclosure are performed. It should be noted that the computer-readable medium described in the embodiments of the present disclosure may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus or device, or a combination of any of the above. More specific examples of computer readable storage medium may include, but are not limited to, electrical connections with one or more wires, portable computer disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the above. In embodiments of the present disclosure, a computer-readable storage medium may be any tangible medium that contains or stores a program that can be used by or in conjunction with an instruction execution system, apparatus, or device. Rather, in embodiments of the present disclosure, a computer-readable signal medium may include a data signal in baseband or propagated as part of a carrier wave; and the data signal carries computer-readable program code therein. Such propagated data signals may take a variety of forms, including but not limited to electromagnetic signals, optical signals, or any suitable combination of the foregoing signals. A computer-readable signal medium can also be any computer-readable medium other than a computer-readable storage medium, which can transmit, propagate, or transport the program for use by or in connection with the instruction execution system, apparatus, or device. Program code included in the computer readable medium may be transmitted using any suitable medium including, but not limited to, electrical wire, optical fiber cable, radio frequency (RF), etc., or any suitable combination of the foregoing.

The above-mentioned computer-readable medium may be included in the above-mentioned electronic device; or may exist alone without being assembled into the electronic device. The above-mentioned computer-readable medium carries one or more computer programs, and when the above-mentioned one or more programs are executed by the electronic device, the electronic device implements the lossless AR video capture and transmission method.

In some embodiments, a lossless AR video capture and transmission method is provided. The method may include: converting combined analog electronic signals synchronously captured by a plurality of image sensors and a plurality of sound pickups into multi-channels of first digital signals; losslessly converting the multi-channels of first digital signals into multi-channels of second digital signals; obtaining multi-channels of first optical signals by performing respective photoelectric conversions on the multi-channels of second digital signals; receiving the multi-channels of first optical signals, and converting the multi-channels of first optical signals into the multi-channels of second digital signals; and parsing at least one channel of second digital signal among the multi-channels of second digital signals into an AR video.

In some embodiments of the present disclosure, the converting combined analog electronic signals synchronously captured by the plurality of image sensors and the plurality of sound pickups into the multi-channels of first digital signals may include: acquiring a combined analog electronic signal synchronously captured by one image sensor and at least one sound pickup corresponding to the one image sensor; and obtaining the multi-channels of first digital signals by respectively performing an analog-to-digital conversion on each of a plurality of the combined analog electronic signals.

In some embodiments of the present disclosure, the obtaining the multi-channels of first optical signals by performing respective photoelectric conversions on the multi-channels of second digital signals may include: obtaining multi-channels of MIPI signals by losslessly outputting, based on a MIPI protocol, each channel of first digital signal of the multi-channels of the first digital signals as a MIPI signal; and obtaining the multi-channels of first optical signals by performing respective photoelectric conversions on the multi-channels of MIPI signals.

In some embodiments of the present disclosure, the parsing at least one channel of second digital signal among the multi-channels of second digital signals into the AR video may include: selecting one or more channels of MIPI signals from the multi-channels of MIPI signals, and synthesizing and parsing the one or more channels of MIPI signals into the AR video.

In some embodiments of the present disclosure, before converting combined analog electronic signals synchronously captured by the plurality of image sensors and the plurality of sound pickups into multi-channels of first digital signals, the method further include: obtaining and transmitting a second optical signal by performing a photoelectric conversion on a third digital signal; restoring the transmitted second optical signal back to the third digital signal by performing a photoelectric conversion the transmitted second optical signal; and in response to the restored third digital signal, converting the combined analog electronic signals synchronously captured by the plurality of image sensors and the plurality of sound pickups into the multi-channels of first digital signals.

In some embodiments of the present disclosure, by using a multiplexing technique, the multi-channels of first optical signals are modulated into at least one physical channel for transmitting the multi-channels of first optical signals.

In some embodiments of the present disclosure, a number of channels of the multi-channels of first optical signals is greater than a number of physical channel of the at least one physical channel.

In some embodiments of the present disclosure, wherein the at least one physical channel is an optical fiber.

According to a second aspect of the present disclosure, a lossless AR video capture apparatus is provided. The lossless AR video capture apparatus may include a plurality of image sensors; a plurality of sound pickups; an analog-to-digital conversion module; and a photoelectric conversion module, wherein the analog-to-digital conversion module is configured to convert combined analog electronic signals synchronously captured by the plurality of image sensors and the plurality of sound pickups into multi-channels of first digital signals; and losslessly convert the multi-channels of first digital signals into multi-channels of second digital signals; wherein the photoelectric conversion module is configured to obtain multi-channels of first optical signals by performing respective photoelectric conversions on the multi-channels of second digital signals.

According to a third aspect of the present disclosure, a lossless AR video receiving apparatus is provided. The lossless AR video receiving apparatus may include a photoelectric conversion module and a processor, wherein the photoelectric conversion module is configured to receive the multi-channels of first optical signals, and convert the multi-channels of first optical signals into the multi-channels of second digital signals; and the processor is configured to parse at least one channel of second digital signal among the multi-channels of second digital signals into an AR video.

According to a fourth aspect of the present disclosure, a lossless AR video capture and transmission system is provided. The lossless AR video capture and transmission system may include a lossless AR video capture apparatus, a lossless AR video receiving apparatus, and an optical splitter, wherein the lossless AR video capture apparatus and the lossless AR video receiving apparatus are connected by an optical cable; wherein the lossless AR video capture apparatus is configured to convert combined analog electronic signals synchronously captured by a plurality of image sensors and a plurality of sound pickups into multi-channels of first digital signals; losslessly convert the multi-channels of first digital signals into multi-channels of second digital signals; and obtain multi-channels of first optical signals by performing respective photoelectric conversions on the multi-channels of second digital signals;

wherein the lossless AR video receiving apparatus is configured to receive the multi-channels of first optical signals, and convert the multi-channels of first optical signals into the multi-channels of second digital signals; and parse at least one channel of second digital signal among the multi-channels of second digital signals into an AR video;

wherein the optical splitter is configured to copy or forward the multi-channels of first optical signals.

According to a fifth aspect of the present disclosure, an electronic device is provided. The electronic device may include: one or more processors; and memory for storing one or more programs, wherein when the one or more programs are executed by the one or more processors, the one or more processors implement the lossless AR video capture and transmission methods according to the first aspect of the present disclosure.

According to a sixth aspect of the present disclosure, a computer-readable medium having computer programs stored thereon, wherein, when the computer programs are executed by a processor, the lossless AR video capture and transmission methods according to the first aspect of the present disclosure is implemented.

The beneficial effects of the present disclosure are follows:
1). the captured image or audio digital signal is directly converted into an optical signal for transmission without the lossy processing, so the data is completely lossless;
2). there is no need to perform a second data encoding, decoding and other lossy processing on the captured image or audio digital signal, so there is no processing delay or only low processing delay in the capture system during the sending process;
3). the optical fibers are used to transmit massive AR video raw data due to its large transmission bandwidth, high transmission rate, and low attenuation, and can easily achieve long-distance transmission (i.e., up to several kilometers), for example, for the traditional capture method 2160P@30 Hz (8 million pixels), the transmission rate of compressed video is about 20 MBps, and the transmission rate of uncompressed video is about 1 GBps;
4). the use of optical signal transmission will not be subject to electromagnetic interference, and at the same time eliminates the electromagnetic interference (EMC/EMI) problem in the process of high-speed signal transmission;
5). the number of cables can be reduced, and the space required for wiring can be almost ignored;
6). the size of the photoelectric conversion chip is extremely small, and it can be integrated into the cable harness interface, which hardly occupies the internal space of the apparatus, so that the design of the capture apparatus can be small and occupy a small space;
7). the lossless AR video capture apparatus or the lossless AR video receiving apparatus no longer needs a dedicated image processing chip, which can reduce the power consumption in the image capture apparatus and reduce the hardware requirements;
8). the lossless AR video capture and transmission apparatus according to the present disclosure has strong expandability, the received data has high integrity, and the processor thereof can obtain and process any kinds of raw image data.

Computer program code for carrying out operations of embodiments of the present disclosure may be written in one or more programming languages, including object-oriented programming languages, such as Java, Smalltalk, C++, Python, or a combination thereof. The programming languages may also include conventional procedural programming languages, such as the "C" language or similar programming languages. The program code may be executed entirely on the user's computer, partly on the user's computer, as a stand-alone software package, partly on the user's computer and partly on a remote computer, or entirely on the remote computer or server. In the case of a remote computer, the remote computer may be connected to the user's computer through any kinds of network, including a local area network (LAN) or a wide area network (WAN), or may be connected to an external computer (for example, using an Internet service provider to connect via Internet).

The flowchart and block diagrams in the drawings illustrate the architecture, functionality, and operation of possible implementations of systems, methods and computer program products according to various embodiments of the present disclosure. In this regard, each block in the flowchart or block diagrams may represent a module, segment, or a portion of code that contains one or more executable instructions for implementing the specified logical functions. It should also be noted that, in some alternative implementations, the functions noted in the blocks may occur in the order, which is different from that noted in the drawings. For example, two blocks shown in succession may, in fact, be executed substantially concurrently, or the blocks may sometimes be executed in the reverse order, depending upon the functionality involved. It is also noted that each block of the block diagrams and/or flowchart illustrations and combinations of blocks in the block diagrams and/or flowchart illustrations can be implemented in dedicated hardware-based systems that perform the specified functions or operations, or can be implemented in a combination of dedicated hardware and computer instructions.

The above descriptions are only preferred embodiments of the present disclosure, and are not intended to limit the present disclosure. Any modification, equivalent replacement, improvement, etc. made within the spirit and principle of the present disclosure shall be included in the protection range of the present disclosure.

What is claimed is:

1. A lossless AR video capture and transmission method, comprising:
   converting combined analog electronic signals synchronously captured by a plurality of image sensors and a plurality of sound pickups into multi-channels of first digital signals;
   losslessly converting the multi-channels of first digital signals into multi-channels of second digital signals;
   obtaining multi-channels of first optical signals by performing respective photoelectric conversions on the multi-channels of second digital signals;
   receiving the multi-channels of first optical signals, and converting the multi-channels of first optical signals into the multi-channels of second digital signals; and
   parsing at least one channel of second digital signal among the multi-channels of second digital signals into an AR video,
   wherein the converting combined analog electronic signals synchronously captured by the plurality of image sensors and the plurality of sound pickups into the multi-channels of first digital signals comprises:
   acquiring a combined analog electronic signal synchronously captured by one image sensor and at least one sound pickup corresponding to the one image sensor; and obtaining the multi-channels of first digital signals by respectively performing an analog-to-digital conversion on each of a plurality of the combined analog electronic signals,
   wherein the obtaining the multi-channels of first optical signals by performing respective photoelectric conversions on the multi-channels of second digital signals comprises: obtaining multi-channels of MIPI signals by losslessly outputting, based on a MIPI protocol, each channel of first digital signal of the multi-channels of the first digital signals as a MIPI signal; and obtaining the multi-channels of first optical signals by performing respective photoelectric conversions on the multi-channels of MIPI signals, and wherein by using a multiplexing technique, the multi-channels of first optical signals are modulated into at least one physical channel for transmitting the multi-channels of first optical signals.

2. The method according to claim 1, wherein the parsing at least one channel of second digital signal among the multi-channels of second digital signals into the AR video comprises:

selecting one or more channels of MIPI signals from the multi-channels of MIPI signals, and synthesizing and parsing the one or more channels of MIPI signals into the AR video.

3. The method according to claim 1, wherein before converting combined analog electronic signals synchronously captured by the plurality of image sensors and the plurality of sound pickups into multi-channels of first digital signals, the method further comprises:

obtaining and transmitting a second optical signal by performing a photoelectric conversion on a third digital signal;

restoring the transmitted second optical signal back to the third digital signal by performing a photoelectric conversion the transmitted second optical signal; and in response to the restored third digital signal, converting the combined analog electronic signals synchronously captured by the plurality of image sensors and the plurality of sound pickups into the multi-channels of first digital signals.

4. The method according to claim 1, wherein a number of channels of the multi-channels of first optical signals is greater than a number of physical channel of the at least one physical channel.

5. The method according to claim 1, wherein the at least one physical channel is an optical fiber.

6. A lossless AR video capture and transmission system, comprising a lossless AR video capture apparatus, a lossless AR video receiving apparatus, and an optical splitter, wherein the lossless AR video capture apparatus and the lossless AR video receiving apparatus are connected by an optical cable;

wherein the lossless AR video capture apparatus is configured to convert combined analog electronic signals synchronously captured by a plurality of image sensors and a plurality of sound pickups into multi-channels of first digital signals; losslessly convert the multi-channels of first digital signals into multi-channels of second digital signals; and obtain multi-channels of first optical signals by performing respective photoelectric conversions on the multi-channels of second digital signals;

wherein the lossless AR video receiving apparatus is configured to receive the multi-channels of first optical signals, and convert the multi-channels of first optical signals into the multi-channels of second digital signals; and parse at least one channel of second digital signal among the multi-channels of second digital signals into an AR video;

wherein the optical splitter is configured to copy or forward the multi-channels of first optical signals wherein the lossless AR video capture apparatus comprises an analog-to-digital conversion module, and the analog-to-digital conversion module is configured to: acquire a combined analog electronic signal synchronously captured by one image sensor and at least one sound pickup corresponding to the one image sensor; and obtain the multi-channels of first digital signals by respectively performing an analog-to-digital conversion on each of a plurality of the combined analog electronic signals, wherein the lossless AR video capture apparatus comprises a photoelectric interface, and wherein the photoelectric interface is configured to: obtain multi-channels of MIPI signals by losslessly outputting, based on a MIPI protocol, each channel of first digital signal of the multi-channels of the first digital signals as a MIPI signal; and obtain the multi-channels of first optical signals by performing respective photoelectric conversions on the multi-channels of MIPI signals, and wherein by using a multiplexing technique, the multi-channels of first optical signals are modulated into at least one physical channel for transmitting the multi-channels of first optical signals.

7. The system according to claim 6, wherein the lossless AR video receiving apparatus comprises an AR processor, wherein the AR processor is configured to select one or more channels of MIPI signals from the multi-channels of MIPI signals, and synthesize and parse the one or more channels of MIPI signals into the AR video.

8. The system according to claim 6, wherein the lossless AR video capture apparatus is further configured to:

obtain and transmit a second optical signal by performing a photoelectric conversion on a third digital signal;

restore the transmitted second optical signal back to the third digital signal by performing a photoelectric conversion the transmitted second optical signal; and in response to the restored third digital signal, convert the combined analog electronic signals synchronously captured by the plurality of image sensors and the plurality of sound pickups into the multi-channels of first digital signals.

9. The system according to claim 6, wherein a number of channels of the multi-channels of first optical signals is greater than a number of physical channel of the at least one physical channel.

10. The system according to claim 6, wherein the at least one physical channel is an optical fiber.

* * * * *